United States Patent [19]

Tsujimoto

[11] Patent Number: 5,689,528
[45] Date of Patent: Nov. 18, 1997

[54] DECISION FEEDBACK EQUALIZER WITH ADAPTIVE FILTER ARRAY OPERATING AS FEEDFORWARD FILTER OF THE EQUALIZER

[75] Inventor: Ichiro Tsujimoto, Tokyo, Japan

[73] Assignee: NEC Corporation, Japan

[21] Appl. No.: 174,428

[22] Filed: Dec. 28, 1993

[30] Foreign Application Priority Data

Dec. 28, 1992 [JP] Japan ................................. 4-348995

[51] Int. Cl.⁶ ............................ H04B 3/08; H03H 7/30
[52] U.S. Cl. ....................... 375/233; 333/18; 364/724.2
[58] Field of Search ........................ 375/232, 233, 375/230, 347, 348; 370/32.1, 286; 364/724.2; 333/18, 28 R

[56] References Cited

U.S. PATENT DOCUMENTS

| | | | |
|---|---|---|---|
| 3,633,107 | 1/1972 | Brady . | |
| 3,879,664 | 4/1975 | Monsen et al. . | |
| 5,084,865 | 1/1992 | Koike | 370/32.1 |
| 5,119,401 | 6/1992 | Tsujimoto | 375/233 |
| 5,247,541 | 9/1993 | Nakai | 375/230 |
| 5,331,663 | 7/1994 | Kurokami | 375/233 |
| 5,335,251 | 8/1994 | Onishi et al. | 375/347 |
| 5,335,359 | 8/1994 | Tsujimoto et al. | 375/347 |
| 5,481,571 | 1/1996 | Balachandran et al. | 375/347 |

OTHER PUBLICATIONS

Gooch, Richard P. and Brian J. Sublett, "Joint Spatial and Temporal Equalization in a Decision-Directed Adaptive Antenna System", Proceedings of the Asilomar Conference on Signals, Systems & Computers, Pacific Grove, pp. 255-259.

Patent Abstracts of Japan, vol. 15, No. 165 (E-1061), Apr. 25, 1991 & JP-A-03 035622 (Matsushita Electric and Co Ltd, Feb. 15, 1991.

Balaban, P. et al., "Optimum Diversity Combining and Equalization in Digital Data Transmission with Applications to Cellular Mobile Radio—Part 1: Theoretical Consideratons", IEEE Transactions on Communications, vol. 40, No. 5, May 1, 1992, pp. 885-894.

Lo, Norm W.K., David D. Falconer, and Asrar U.H. Sheikh, "Adaptive Equalization and Diversity Combining for a Mobile Radio Channel", Institute of Electrical and Electronics Engineers, Dec. 1990, pp. 923-927.

*Primary Examiner*—Wellington Chin
*Assistant Examiner*—Jean B. Corrielus
*Attorney, Agent, or Firm*—Ostrolenk, Faber, Gerb & Soffen, LLP

[57] ABSTRACT

In a decision feedback equalizer, symbols from an array of antennas are fed to a first filter where they are respectively multiplied with first weight coefficients and supplied to a combiner where they are combined with second symbols to produce a combined symbol. A decision circuit makes a decision on the combined symbol and produces a decision symbol. Decision symbols successively generated by the decision circuit are fed to a second filter where they are respectively multiplied with second weight coefficients and supplied to the combiner as the second symbols. A difference between the decision symbol and the combined symbol is detected to produce a decision error. Each of the first weight coefficients is updated according to the decision error and the symbol from each of the antenna systems and each of the second weight coefficients is updated according to the decision error and each of the decision symbols successively supplied from the decision circuit so that the mean square value of the decision error is reduced to a minimum.

20 Claims, 10 Drawing Sheets

DECISION FEEDBACK EQUALIZER WITH ADAPTIVE FILTER ARRAY OPERATING AS FEEDFORWARD FILTER OF THE EQUALIZER

BACKGROUND OF THE INVENTION

1. Field of the Invention

The present invention relates generally to radio receivers for digital radio communication systems, and more specifically to a decision feedback equalizer with adaptive filters connected to an array of antennas for cancelling both multipath intersymbol interference and jamming signals.

2. Description of the Related Art

It is known that an array of adaptive antennas is used in combination with a decision feedback equalizer. The antenna array includes an adaptive filter array connected to an array of antennas, a reference signal source and an error detector that detects an error between the output of the filter array and the reference signal and adaptively controls the filter array according to what is known as least mean square (LMS) algorithm so that the mean square value of the error is reduced to a minimum. With this adaptive control, the main lobe of the antennas is oriented in the arrival direction of a desired signal to allow reception of the desired signal at maximum gain. The decision feedback equalizer includes a feedforward filter connected to the output of the filter array, a feedback filter, a combiner for summing the outputs of both feedforward and feedback filters, and a decision circuit for making a decision on the output of the combiner and supplying a decision symbol to the feedback filter. An error detector is connected across the decision circuit for detecting a decision error. Each of the feedforward and feedback filters is a transversal filter comprised by a tapped-delay line and a plurality of multipliers connected to the taps of the delay line for multiplying the tap signals with tap-weight coefficients. The tap-weight coefficients of both filters are derived by correlating the decision error with their tap signals and updating the correlation by subtracting it from the previous value so that the mean square value of the decision error is reduced to a minimum. With the mean square of decision error being controlled to a minimum, intersymbol interference caused by multipath fading is cancelled. Therefore, the LMS adaptive control is independently performed by the adaptive filter array and the decision feedback equalizer.

In the presence of a strong jamming signal, a null point is formed in the directivity pattern of the antennas for nulling the jamming signal. However, this nulling effect causes the main lobe of the antenna array to slightly offset from the arrival direction of the desired signal, making it impossible to precisely orient the main lobe in the arrival direction of the desired signal. A worst situation can occur if a jamming signal is arriving in the same direction as the desired signal.

On the other hand, if the tapped-delay line of the feedforward filter has a unit delay time corresponding to one half of the symbol interval, the feedforward filter operates not only as a canceller for removing time dispersed components of the desired signal due to multipath fading, but as a matched filter for providing maximal ratio combining of those components of the desired signal that occur at the reference time so that the signal-to-noise ratio increases to a maximum.

However, the adaptive filter array operates by cancelling all multipath components or the desired signal. Thus, the feedforward filter of the decision feedback equalizer no longer produces the matched filtering effect.

SUMMARY OF THE INVENTION

It is therefore an object of the present invention to provide a decision feedback equalizer with an adaptive antenna array capable of cancelling both multipath fading distortion and jamming signals.

The object of the present invention is obtained by operating the adaptive array filter as a feedforward filter of the decision feedback equalizer and controlling it and the feedback filter of the equalizer so that the mean square value of the equalizer's decision error is reduced to a minimum so that the directivity pattern of the antenna array and the adaptive equalization of the decision feedback equalizer are simultaneously optimized.

According to a broader aspect of the present invention, there is provided a decision feedback equalizer for a radio receiver wherein an array of antenna systems is provided for receiving a modulated carrier and recovering a series of symbols from each antenna system. The decision feedback equalizer includes first and second filters. The first filter is connected to the antenna systems for respectively multiplying symbols from the antenna systems with first weight coefficients and supplying the multiplied symbols to a combiner where they are combined with second symbols to produce a combined symbol. A decision circuit makes a decision on the combined symbol and produces a decision symbol. Decision symbols successively generated by the decision circuit are supplied to the second filter where they are respectively multiplied with second weight coefficients and supplied to the combiner as said second symbols. A difference between the decision symbol and the combined symbol is detected to produce a decision error. Each of the first weight coefficients is updated according to the decision error and the symbol from each of the antenna systems and each of the second weight coefficients is updated according to the decision error and each of the decision symbols successively supplied from the decision circuit so that the mean square value of the decision error is reduced to a minimum.

According to a first specific aspect of the present invention, the first filter comprises a plurality multipliers for multiplying symbols from the antenna systems with the first weight coefficients and supplying the multiplied symbols to the combiner.

According to a second specific aspect of the present invention, the first filter comprises a plurality of tapped-delay lines connected respectively to the antenna systems, and a plurality of groups of multipliers which groups correspond respectively to the tapped-delay lines. The multipliers of each group are connected respectively to successive taps of the corresponding tapped-delay line for respectively multiplying symbols at the successive taps with the first weight coefficients and supplying the multiplied symbols to the combiner.

According to a third specific aspect, the first filter comprises a plurality of groups of multipliers which multiply symbols from the antenna systems with the first weight coefficients. A plurality of summers are provided correspondingly respectively to the multiplier groups for summing the multiplied symbols of the corresponding multiplier group and producing therefrom a plurality of summed symbols. A plurality of delay elements are provided for respectively delaying the summed symbols by different amounts corresponding respectively to the summers and applying the delayed summed symbols to the combiner.

Specifically, the second filter includes a tapped-delay line connected to the decision circuit for producing a series of decision symbols and a plurality of multipliers connected respectively to successive taps of the delay line for respectively multiplying the decision symbols at the successive taps with the second weight coefficients and supplying the multiplied decision symbols to the combiner.

BRIEF DESCRIPTION OF THE DRAWINGS

The present invention will be described in further detail with reference to the accompanying drawings, in which.

DETAILED DESCRIPTION

Figure 1:
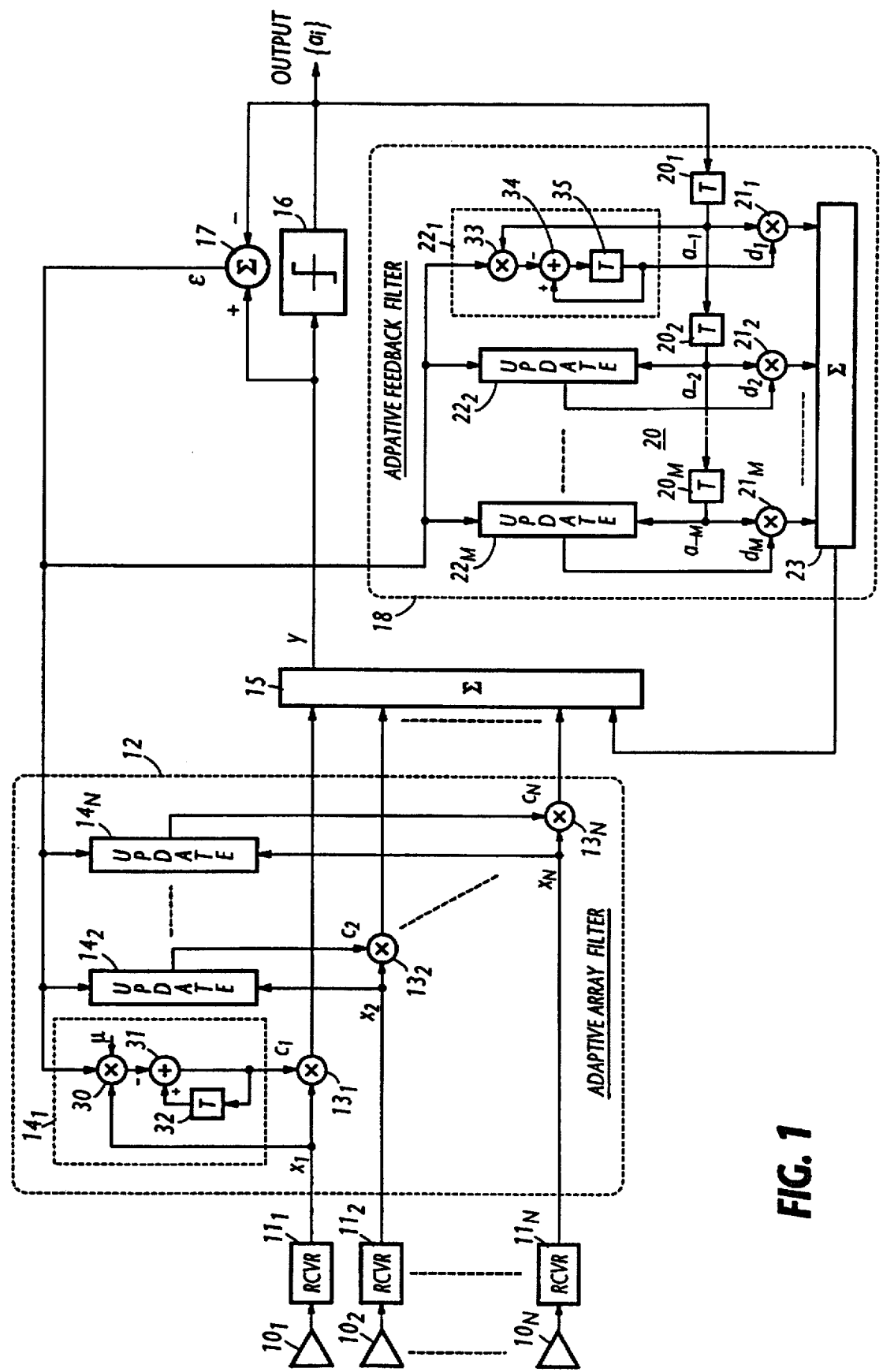
FIG. 1 is a block diagram of a digital radio receiver according to a first embodiment of the present invention.

Referring now to FIG. 1, there is shown a receiver for a digital radio communication system according to the present invention. At the transmit site of the system, a symbol sequence $\{\ldots a_{-1}, a_0, a_{+1} \ldots\}$ is orthogonally modulated onto a carrier in a format such as quadrature phase shift keying and transmitted. The receiver of this invention comprises an array of antennas $10_1$–$10_N$ spaced apart at intervals corresponding to the half-wavelength $(-\lambda/2)$ of the transmitted carrier for receiving a signal propagating over multipath fading channels. The outputs of antennas $10_1$–$10_N$ are connected respectively to receivers $11_1$–$11_N$ where they are demodulated to recover complex baseband signals $x_1, x_2, \ldots x_N$ and applied respectively to complex multipliers $13_1$–$13_N$ of an adaptive array filter 12, where they are multiplied with weight coefficients $c_1, c_2, \ldots c_N$, respectively, supplied from coefficient update circuits $14_1$–$14_N$ for cancelling precursors (future symbols) of Intersymbol Interference caused by multipath fading. The weighted complex signals are summed together by a combiner 15 to produce a complex sum signal "y".

The output of combiner 15 is applied to a decision circuit 16 where it is compared with decision thresholds and a decision is made in favor of logic-1 or logic-0 depending on the result of the comparison, producing a sequence of estimated symbols $\{a_i\}$.

An error detector 17 is connected across the input and output of decision circuit 16 to detect a decision error $\epsilon$. The decision error $\epsilon$ is supplied to update circuits $14_1$–$14_N$ for deriving and updating the weight coefficients $c_1, c_2, \ldots c_N$. Specifically, each update circuit $14_i$ (where $i=1, 2, \ldots N$) includes a complex correlator 30 for multiplying the decision error $\epsilon$ with a correction factor $\mu$ and correlating the corrected decision error $\mu\epsilon$ with complex conjugate of the incoming symbol "$x_i^*$" (where (*) represents the complex conjugate), and a subtractor 31 for subtracting the output of complex correlated 30 from the output of a delay element 32 which delays the output of subtractor 31 by symbol interval T to produce a weight coefficient $c_i$ from the output of subtractor 32. The operation of each update circuit 14 proceeds in a way that satisfies the LMS (least means square) algorithm $c_i^n - c_i^{n-1} - \mu x_i^* \epsilon$ (where n is the time indicator) so that the mean square value of the decision error $\epsilon$ is reduced to a minimum.

The output of decision circuit 16 is applied to a feedback filter 18 in which postcursors (previous symbols) of intersymbol interference are cancelled. The feedback filer 18 comprises a tapped delay line 20 formed by delay elements $20_1$–$20_M$ each introducing a delay time of symbol interval T to a successive output of decision circuit 16 to produce a series of complex tap signals $a_{-1}, a_{-2}, \ldots, a_{-M}$ along the taps of the delay line which are the earlier versions of the symbol $a_0$ at the output of decision circuit 16. These tap signals are respectively multiplied by complex multipliers $21_1$–$21_M$ with tap weight coefficients $d_1, d_2, \ldots d_M$ supplied from coefficient update circuits $22_1$–$22_M$. The weighted tap signals are summed by a summer 23 to produce a sum signal which is applied to the combiner 15 for cancelling postcursor intersymbol interference. Each update circuit $22_j$ (where $j=1, 2 \ldots M$) includes a complex correlator 33 for multiplying the decision error $\epsilon$ with the correction factor $\mu$ and correlating the multiplied decision error $\mu\epsilon$ with complex conjugate of the decision symbol "$a_{-j}^*$", and a subtractor 34 for subtracting the output of complex correlator 33 from the output of a delay element 35 which delays the output of subtractor 34 by symbol interval T. The operation of each update circuit 22 proceeds in a way that satisfies the LMS algorithm $d_j^n = d_j^{n-1} - \mu a_{-j}^* \epsilon$ to minimize the mean square value of the decision error $\epsilon$.

A mathematical analysis will be given of the first embodiment of the present invention to indicate that the operation of adaptive array filter 12 and feedback filter 18 can be mathematically represented by simultaneous linear equations and that the adaptive array filter 12 functions as a feedforward filter which forms part of the decision feedback equalizer comprising the decision circuit 16, error detector 17 and feedback filter 18.

The weight coefficients $c_i$ and $d_j$ that minimize the mean square value of decision output $\epsilon$ are determined by a normal equation (Wiener-Hoph Equation) using the orthogonality principle. From the following relations, the normal Equation can be derived, using linear weight coefficients as unknown variables.

$$E[\epsilon \cdot x_i^*]=0 \tag{1}$$

$$E[\epsilon \cdot a_i^*] = 0$$

where E represents the expectation, $\epsilon = y - a_0$, and y is given by:

$$y = [c_1, c_2, \ldots c_N] \begin{bmatrix} x_1 \\ x_2 \\ \cdot \\ \cdot \\ \cdot \\ x_N \end{bmatrix} + [d_1, d_2, \ldots d_M] \begin{bmatrix} a_{-1} \\ a_{-2} \\ \cdot \\ \cdot \\ \cdot \\ a_{-M} \end{bmatrix} \quad (3)$$

Figure 2:
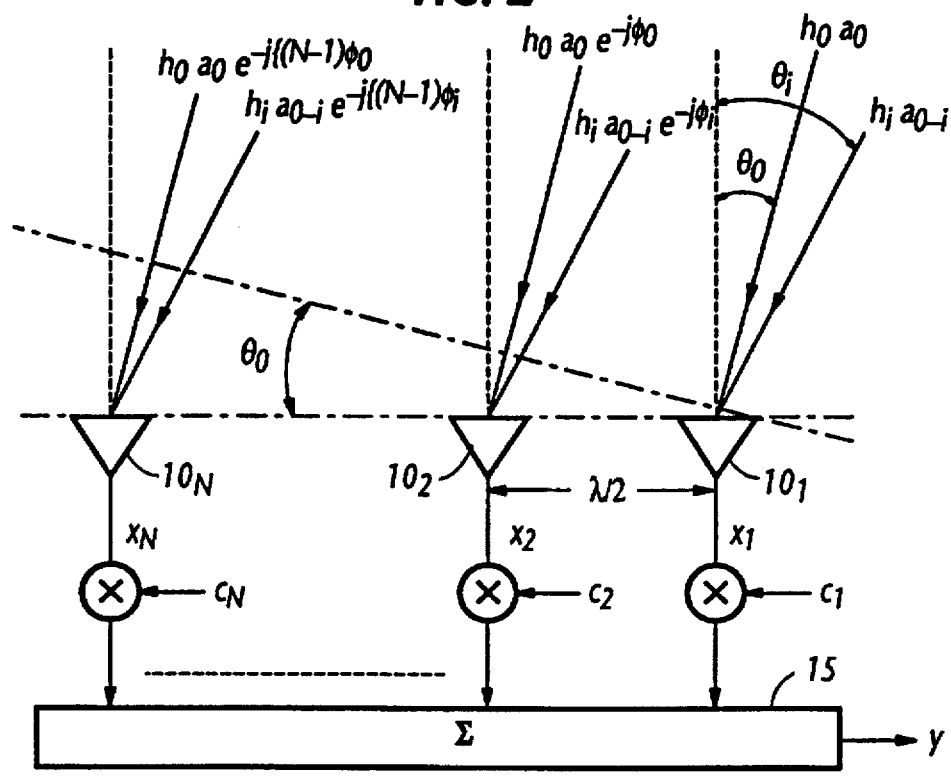
FIG. 2 is a block diagram of a simplified model of the first embodiment for computer simulation.

A simplified version of the embodiment of FIG. 1 is illustrated in FIG. 2 to derive the normal equation using a simplified dispersive propagation model. Let $h_i$ represent the impulse response of a propagation path, with $h_0$ representing a reference impulse response for the symbol of interest. The impulse responses $h_{-i}$ and $h_{+i}$ represent the precursor and the postcursor, respectively. The received signals are represented by convolution of the transmitted symbol sequence $\{a_i\}$ and the impulse responses $h_i$. The main signal component $S_i$ received by each antenna is given by $h_0 a_0$ and a multipath component received by the antenna is given by $h_i a_{0-i}$.

Because of the $\lambda/2$ antenna spacing, the main signal component $S_i$ received by antenna $10_1$ is delayed by an amount equal to exp $\{-j(i-1)\phi_0\}$ with respect to the main signal component $S_1$ received by the first antenna $10_1$, where $\phi_0$ is the angle of arrival of the main signal $S_i$ to the axis of each antenna and is given by $\phi_0 = \pi \sin\theta_0$. Therefore, the baseband signals $x_i$ are represented as follows:

$$x_i = \sum_{n=-\infty}^{+\infty} h_n \exp\{-j(i-1)\phi_n\} a_{0-n} + n_i \quad (4)$$

where $n_i$ is the noise contained in the output of antenna $10_i$ and $\phi_n$ represents the angle of arrival of a multipath signal component corresponding to the n-th impulse response of the dispersive propagation model and is given by $\phi_n = \pi \sin\theta_n$. From Equations (3) and (4), the normal Equation is given as follow:

$$\begin{bmatrix} \Psi_{pq} & -H^* \\ H^T & -I \end{bmatrix} \begin{bmatrix} C \\ D \end{bmatrix} = \begin{bmatrix} S \\ 0 \end{bmatrix} \quad (5)$$

where, C and D are in the form $$C = \begin{bmatrix} c_1 \\ c_2 \\ \cdot \\ \cdot \\ \cdot \\ c_N \end{bmatrix}, D = \begin{bmatrix} d_1 \\ d_2 \\ \cdot \\ \cdot \\ \cdot \\ d_M \end{bmatrix} \quad (6)$$

$\Psi_{pq}$ represents the N×N correlation matrix of signals received by antennas $10_1 \sim 10_N$ and the elements of this matrix are given by:

$$\Psi_{pq} = \left[ \sum_{n=-\infty}^{\infty} h_n^* \cdot h_n \cdot \exp\{j(p-q)\phi_n\} \cdot \sigma^2 \cdot \delta_{pq} \right] \quad (7)$$

where p, q=1, 2, . . . , N, $\sigma^2$ is the noise power, $\delta_{pq}$ the Kronecker's delta which equals 1 if p=q or 0 if p≠q, I is an M×M unit matrix, and 0 is an M-th order zero vector, H is the N×M correlation matrix of the feedback filter 18 given by Equation (8), and S is a correlation vector correlating the symbol vector $(x_1, x_2, \ldots x_n)$ with the decision output symbol as given by Equation (9).

$$H = \begin{bmatrix} h_1 & \cdots & h_M \\ h_1 \cdot \exp\{-j\phi_1\} & \cdots & h_M \cdot \exp\{-j\phi_M\} \\ h_1 \cdot \exp\{-j2\phi_1\} & \cdots & h_M \cdot \exp\{-j2\phi_M\} \\ \cdot & \cdots & \cdot \\ \cdot & \cdots & \cdot \\ \cdot & \cdots & \cdot \\ h_1 \cdot \exp\{-j(N-1)\phi_1\} & \cdots & h_M \cdot \exp\{-j(N-1)\phi_M\} \end{bmatrix} \quad (8)$$

$$S = h_0^* \begin{bmatrix} 1 \\ \exp\{j\phi_0\} \\ \exp\{j2\phi_0\} \\ \cdot \\ \cdot \\ \cdot \\ \exp\{j(N-1)\phi_0\} \end{bmatrix} \quad (9)$$

Equation (5) indicates that the operation of adaptive array filter 12 and feedback filter 18 is represented by simultaneous linear equations and that the adaptive array filter 12 functions as a feedforward filter of the decision feedback equalizer. Therefore, the present invention is not simply a sum of, but an integrated combination of an adaptive array filter and a decision feedback equalizer.

A computer simulation was made for evaluating the present invention in terms of the directivity pattern of the antenna array which is given by:

$$P(\theta) = IC^T \cdot \Gamma = \left| \sum_{n=1}^{n=N} c_n \cdot \exp(-I(n-1)\phi(\theta)) \right| \quad (10)$$

where, $\Gamma$ is a unit DC signal vector that is assumed to be arriving at antennas $10_1 \sim 10_N$ at an angle 0 and is given by;

$$\Gamma^T = 1 \cdot [1 \exp\{-j\phi(\theta)\} \exp\{-j2\phi(\theta)\} \ldots \exp\{j(N-1)\phi(\theta)\}] \quad (12)$$

where $\phi(q) = \pi \sin\theta$.

In the computer simulation, a four-element antenna array (each element with a 10 dB signal-to-noise ratio) and a single-delay tap feedback filter were used for a three-wave multipath fading model by representing a main signal as $h_0 a_0$, a phase-advanced multipath component as $h_{-1} a_{+1}$, and a phase-lagged multipath component as $h_{+1} a_{-1}$, and setting the amplitude of the impulse responses to a unit value (i.e., $|h_{-1}| = |h_0| = |h_{+1}| = 1$, which represents the worst situation where the frequency selective fade is of infinite value) and setting the arrival angle of the main signal ($\theta_0$), phase-advanced and lagged multipath components ($\theta_{-1}$) and ($\theta_{+1}$) as $\theta_0 = 20°$, $\theta_{-1} = 45°$ and $\theta_{+1} = 20°$, respectively. For purposes of comparison, a simulation was further made on a prior art four-element adaptive array receiver (which includes no feedback filter), using the same operating parameters just described. Results of the computer simulations are shown in FIGS. 3A and 3B.

Figure 3A:
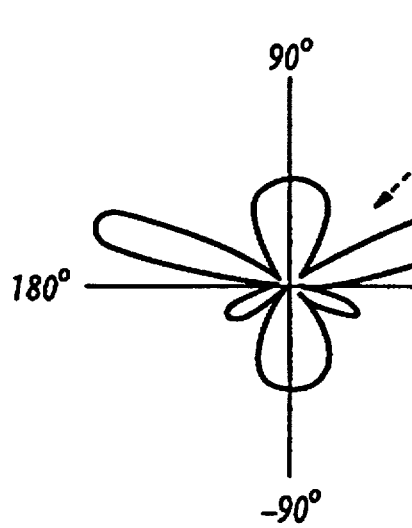
FIG. 3A is a graphic representation of the result of a computer simulation on the four-antenna model of FIG. 2.
Figure 3B:
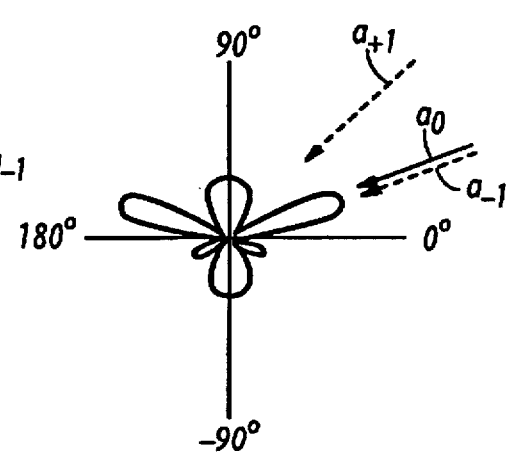
FIG. 3B is a graphic representation of the result of a computer simulation on a prior art four-element antenna array.

The directivity pattern shown at FIG. 3A is the result of the simulation derived from the four-element model of FIG. 2. It is seen that the main lobe is oriented in the arrival direction ($\theta = 20°$) of the main signal and a null point (a point of zero gain) is formed in the arrival direction of the phase-advanced multipath component. While the phase-lagged multipath component $h_{+1} a_{-1}$ is summed with the main signal, it is cancelled with an estimate of the symbol $a_{-1}$ derived from the first delay-line tap of the feedback filter. It is therefore seen that, regardless of the presence of multipath components of a desired signal, the directivity pattern of the antenna array is constantly oriented in the arrival direction of the main component of the desired signal so that it is received at a maximum signal-to-noise ratio. On the other hand, the directivity pattern shown at FIG. 3B is the result of simulation derived from the prior art adaptive array receiver. Since the prior art receiver lacks the feedback filter, but instead provides cancellation by forming null points in the antennas—directivity pattern, it is impossible to remove the phase-lagged multipath component $h_{+1}$ $a_{-1}$ from the main component with which it is received with the same antenna gain. As a result, the reaction of the phase-lagged multipath component would cause the antenna gain to be reduced at the cost of the main signal.

While mention has been made of four-element antenna arrays, it is useful to describe the feature of two-element arrays which will find application in cellular mobile units. If a prior art two-element adaptive receiver is used, it is necessary to form two null points in the directivity pattern for cancelling phase-advanced and phase-lagged multipath components. However, this requirement goes beyond the capability of the two-element array. On the other hand, with the two-element array of the present invention, the phase-lagged multipath component can be cancelled with the feedback filter, and hence, the antenna array is required to form only one null point in the arrival direction of the phase-advanced multipath component.

Figure 4:
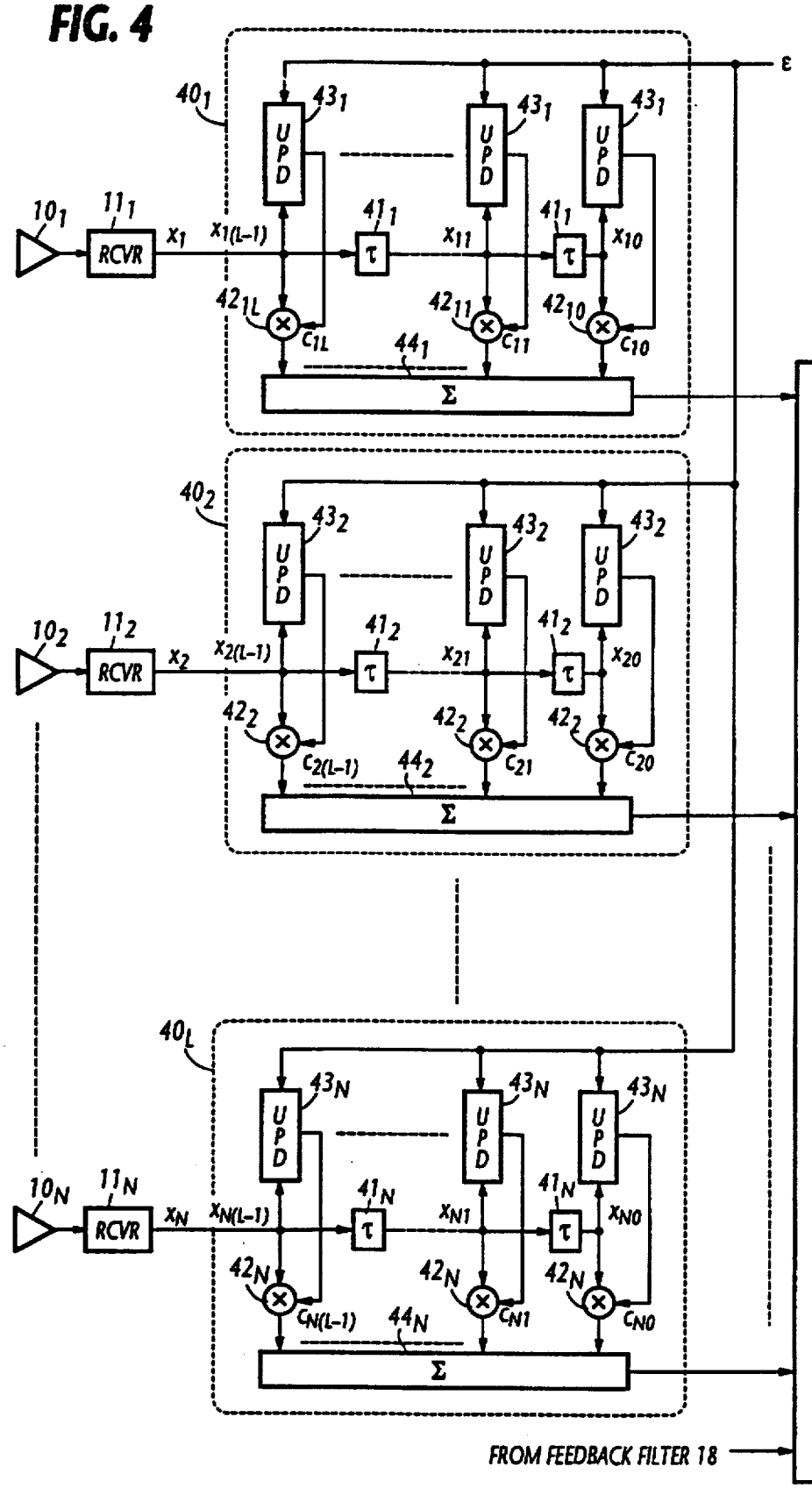
FIG. 4 is a block diagram of a digital radio receiver according to a second embodiment of the present invention.
Figure 4A:
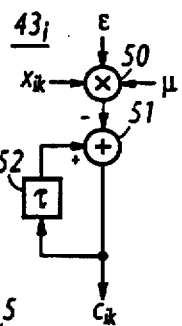
FIG. 4a is a circuit diagram showing details of each of the update circuits of FIG. 4.

A second embodiment of the present invention is shown in FIG. 4. The second embodiment features that it is capable of jamming signal cancellation as well as ISI (intersymbol Interference) adaptive equalization. As illustrated, a plurality of tapped-delay-line adaptive filters $40_1$–$40_L$ of identical configuration are provided for antennas $10_1$–$10_N$, respectively, instead of the adaptive array filter 12 of the first embodiment. Each TDL adaptive filter $40_i$ (where i=1, 2, ... , N) includes N tapped-delay-line elements $41_i$ connected to receive a baseband symbol $x_i$ from the associated receiver $11_i$. Delay-line elements $41_i$ each introduce a delay time τ, typically one half of the symbol interval T, to produce tap signals $x_{ik}$ (where k=0, 1, . . . L−1) and a plurality of complex multipliers $42_i$ respectively connected to successive taps of the delay line for multiplying tap signals $x_{i0}$–$x_{i(L-1)}$ with tap-weight coefficients $c_{i0}$–$c_{i(L-1)}$ respectively supplied from tap-weight update circuits $43_i$. As illustrated in FIG. 4a, each update circuit $43_i$ includes a complex correlator 50 for multiplying the decision error ε with a correction factor μ and correlating the corrected decision error με with complex conjugate of the corresponding tap signal "$x_{ik}^*$", and a subtractor 51 for subtracting the output of complex correlator 50 from the output of a delay element 52 which delays the output of subtractor 51 by Interval τ to produce a weight coefficient $c_{ik}$ at the output of subtractor 51. The operation of each update circuit $43_i$ proceeds to satisfy the LMS algorithm $c_{ik}^n = c_{ik}^{n-1} - \mu x_{ik}^* ε$ so that the mean square value of the decision error ε is reduced to a minimum.

The weighted tap signals of each adaptive filter $40_i$ are summed by a summer $44_i$ to produce a sum signal which is applied to the combiner 15.

In a manner similar to the first embodiment, a normal equation is obtained as follows:

$$\begin{bmatrix} \Psi_{11} & \Psi_{12} & \cdots & \Psi_{1N} & -H_1^* \\ \Psi_{21} & \Psi_{22} & \cdots & \Psi_{2N} & -H_2^* \\ \vdots & \vdots & \cdots & \vdots & \vdots \\ \Psi_{N1} & \Psi_{N2} & \cdots & \Psi_{NN} & -H_L^* \\ H_1^T & H_2^T & \cdots & H_N^T & -I \end{bmatrix} \begin{bmatrix} C_1 \\ C_2 \\ \vdots \\ C_N \\ D \end{bmatrix} = \begin{bmatrix} S_1^* \\ S_2^* \\ \vdots \\ S_N^* \\ 0 \end{bmatrix} \quad (13)$$

where, the N×N submatrix $\psi_{pq}$ is an Hermit matrix and given by;

$$\phi(p,q)_{kj} = \sum_{n=-\infty}^{+\infty} h_{j-n}^* h_{j-n} \exp\{j(p-1)\phi_{j-n} - j(q-1)\phi_{j-n}\} + \delta_{pq}\delta_{ij}\sigma^2 \quad (14)$$

and equals the transposed complex conjugate $\psi_{qp}^{T*}$. The N×M correlation matrix H, the correlation vector $S_k$, the tap coefficient vectors $C_k$ and D are given by:

$$H = \begin{bmatrix} h_1 \cdot \exp\{-j(k-1)\phi_1\} & \cdots & h_M \cdot \exp\{-j(k-1)\phi_M\} \\ h_2 \cdot \exp\{-j(k-1)\phi_2\} & \cdots & h_{M+1} \cdot \exp\{-j(k-1)\phi_{M+1}\} \\ h_3 \cdot \exp\{-j(k-1)\phi_3\} & \cdots & h_{M+2} \cdot \exp\{-j(k-1)\phi_{M+2}\} \\ \vdots & \cdots & \vdots \\ h_L \cdot \exp\{-j(k-1)\phi_L\} & \cdots & h_{M+L-1} \cdot \exp\{-j(k-1)\phi_{M+L-1}\} \end{bmatrix} \quad (15)$$

$$S_k = \begin{bmatrix} h_0 \exp\{-j(k-1)\phi_0\} \\ h_1 \exp\{-j(k-1)\phi_1\} \\ h_2 \exp\{-j(k-1)\phi_2\} \\ \vdots \\ h_{L-1} \exp\{-j(k-1)\phi_{L-1}\} \end{bmatrix} \quad (16)$$

$$C_k^T = [c_{k0}, c_{k1}, \ldots, c_{k(L-1)}] \quad (17)$$
$$D^T = [d_1, d_2, \ldots, d_M] \quad (18)$$

Since the TDL adaptive filters are a linear system, the principle of superposition is applied to treat them as a single TDL adaptive filter so that it forms a decision feedback equalizer with the feedback filter 18. The principle of superposition is first applied to the first (leftmost) taps of all TDL filters by summing the first tap signals of all TDL adaptive filters to obtain a tap-signal sum "$x_{1(L-1)} + x_{2(L-1)} + \ldots + x_{N(L-1)}$", followed by the summing of the second tap signals. The process is repeated until all signals at the last (rightmost) taps are summed together, producing a sum "$x_{10} + x_{20} + \ldots + x_{N0}$". A similar process is performed on all the tap weights, beginning with the first tap weight. By setting a reference tap to the 0-th tap of each adaptive filter, precursor and postcursor distortions are respectively cancelled by the equivalent single TDL adaptive filter and the feedback filter 18. One important feature of the decision feedback equalizer is that, unlike the conventional decision feedback equalizer, the antenna array has a directivity pattern whose main lobe is oriented to the arrival direction of desired signal so that the signal-to-noise ratio is increased to a maximum. Using the principle of superposition, the main lobe $P_0(\theta)$ of the directivity pattern of antennas $10_1$–$10_L$ is obtained by the sum of reference taps of all TDL adaptive filters as represented by Equation (19a) below, and the sidelobes $P_m(\theta)$ of the pattern are obtained by the sum of all taps other than the reference taps as represented by Equation (19b):

$$P_0(\theta) = \left| \sum_{k=1}^{N} c_{k0} \exp\{-j(k-1)\pi \sin \theta\} \right| \quad (19a)$$

$$P_m(\theta) = \left| \sum_{k=1}^{N} c_{km} \exp\{-j(k-1)\pi \sin \theta\} \right| \quad (19b)$$

where m=1, 2, . . . , L−1.

In the previous embodiment, a null point is formed in the arrival direction of a phase advanced multipath signal only if such a phase advanced multipath signal exists. However, more than one null point is formed if more than one phase advanced multipath signal is received. Whereas, in the second embodiment, the adaptive array control is such that it does not create null points respectively for the individual phase advanced multipath signals, but operates only to keep the main lobe constantly oriented in the arrival direction of the main signal. The sidelobes of the antennas given by Equation (17b) capture phase advanced multipath signals. These signals are combined with a phase advanced multipath signal captured by the main lobe given by Equation (17a) and cancelled out in the combiner 15. A phase lagged multipath signal captured by the main lobe is cancelled in the combiner 15 with a signal produced by the feedback filter 18 as in the first embodiment. With the unit delay time $\tau$ being set equal to T/2, the TDL adaptive filters $40_1$–$40_L$ are not only capable of cancelling precursor distortions, but capable functioning as a matched filter to provide the effect of combining the dispersed desired signal energies into a signal of high signal-to-noise ratio (i.e., high implicit diversity gain). If the unit delay time $\tau$ is set to a fraction other than T/2, the TDL adaptive filters $40_1$–$40_L$ will be able to cancel foldover distortion caused by a misalignment of the receiver clock timing from the transmitted clock.

Figure 5:
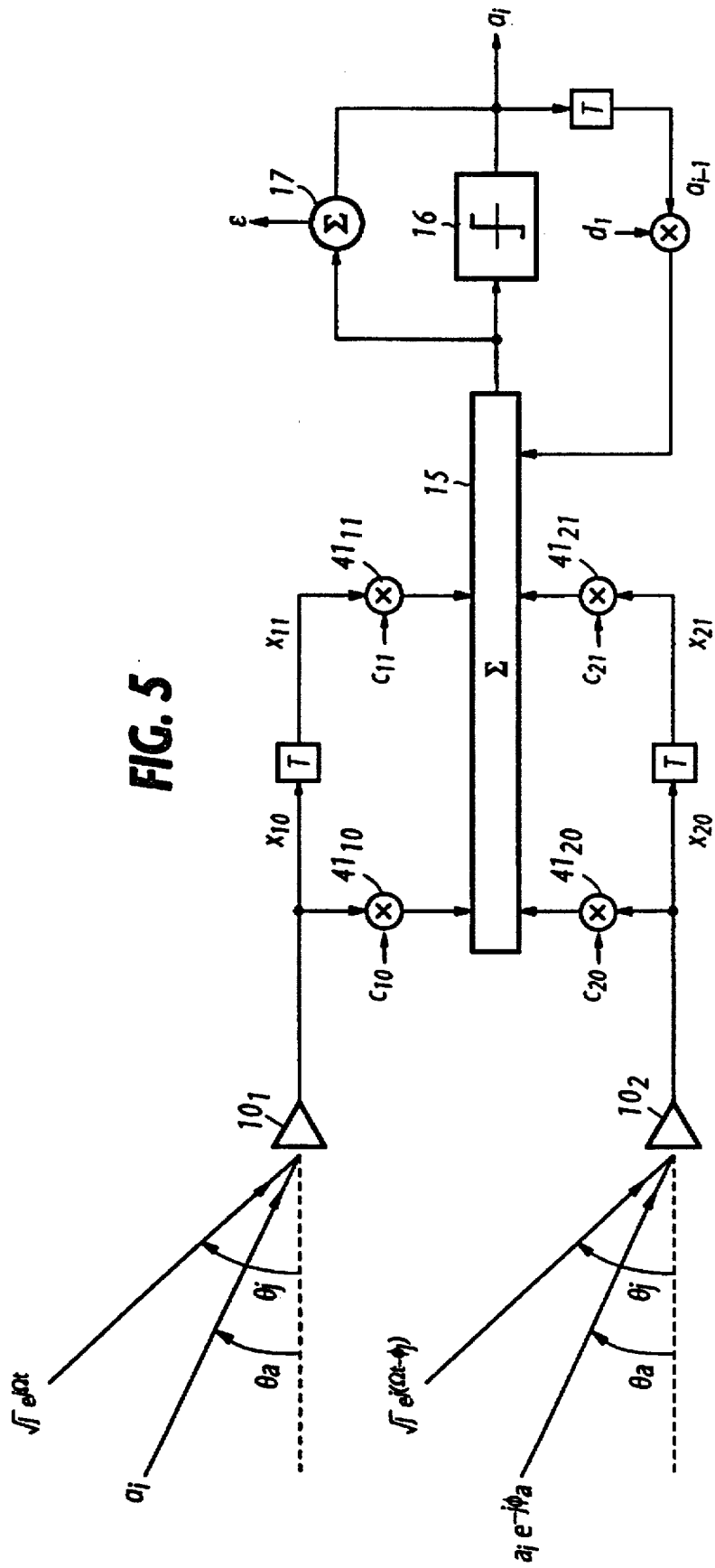
FIG. 5 is a block diagram of a simplified model of the second embodiment for computer simulation using a single hypothetical interferer.

Another important feature of the embodiment of FIG. 4 is the ability to cancel continuous wave (CW) jamming signals. A computer simulation was made on a simplified version of the FIG. 4 embodiment, using two TDL array filters each having two delay taps and a feedback filter having only one delay tap as shown in FIG. 5. The angle of arrival of both desired and jamming signals was chosen at 45°, the D/U and S/N ratio were set equal to 0 dB and 20 dB, respectively, and the center frequency of the jamming signal was taken at zero ($\Omega$=0). Reference tap weights $c_{10}$ and $c_{20}$ are multiplied with later symbols and tap weights $c_{11}$ and $c_{21}$ are multiplied with earlier symbols. Symbol interval T is used as a unit delay time for the two TDL adaptive filters.

A propagation model is considered for the computer simulation by assuming that a CW interference signal is arriving from a single jamming source and a desired signal has no multipath component. In FIG. 5, the desired signal is represented as a modulated symbol $a_i$ arriving at an angle $\theta_a$ and the jamming signal as $\sqrt{J}\exp(j\Omega t)$ arriving at an angle $\theta_j$. A phase difference $\exp(-J\phi_a)$ occurs between the desired signal components arriving respectively at the two antennas. Likewise, a phase difference $\exp(-J\phi_j)$ exists between the jamming signal components arriving at these antennas (where $\phi_a=\pi\sin\theta_a$, $\phi_j=\pi\sin\theta_j$).

The following normal Equation yields:

$$\begin{bmatrix} \psi_{11} & \psi_{12} & -H_1^* \\ \psi_{21} & \psi_{22} & -H_2^* \\ H_1^T & H_2^T & -1 \end{bmatrix} \begin{bmatrix} C_1 \\ C_2 \\ D \end{bmatrix} = \begin{bmatrix} S_1^* \\ S_2^* \\ 0 \end{bmatrix} \quad (20)$$

where, $\psi_{22}=\psi_{11}$ and $\psi_{21}=\psi_{12}^{T*}$, and $\psi_{11}$ and $\psi_{12}$ are given as follows:

$$\psi_{11} = \begin{bmatrix} 1+\xi+\rho & \xi\exp(+j\Omega T) \\ \xi\exp(-j\Omega T) & 1+\xi+\rho \end{bmatrix} \quad (21a)$$

$$\psi_{12} = \begin{bmatrix} \exp(-j\phi_a)+\xi\exp(-j\phi_j) & \xi\exp\{j\Omega T-\phi_j)\} \\ \xi\exp\{-j\Omega T+\phi_j)\} & \exp(-j\phi_a)+\xi\exp(-j\phi_j) \end{bmatrix} \quad (21b)$$

$\xi = j/a_i^* a_i$ (22a)
$\rho = \sigma^2/a_i^* a_i$ (22b)
$H_1^T = [0\ 1]$ (22c)
$H_2^T = [0\ \exp(-j\phi_a)]$ (22d)
$S_1^T = [0\ 1]$ (22e)
$S_2^T = [\exp(-j\phi_a)\ 0]$ (22f)
$0 = [0]$ (22g)
$C_1^T = [c_{10}\ c_{11}]$ (22h)
$C_2^T = [c_{20}\ c_{21}]$ (22i)
$D^T = [d_1]$ (22j)

Note that $\xi$ is the reciprocal of the D/U (desired-to-undesired signal) ratio and $\rho$ is the reciprocal of the signal-to-noise ratio.

Figure 6A:
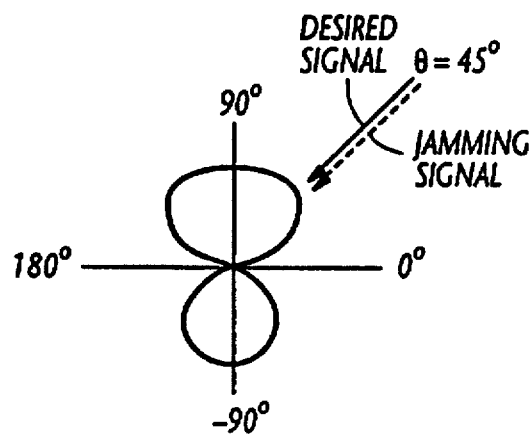
FIGS. 6A, 6B and 6C are graphic representations of the results of computer simulation on the model of FIG. 5, wherein the frequency of the jamming signal is kept constant.
Figure 6B:
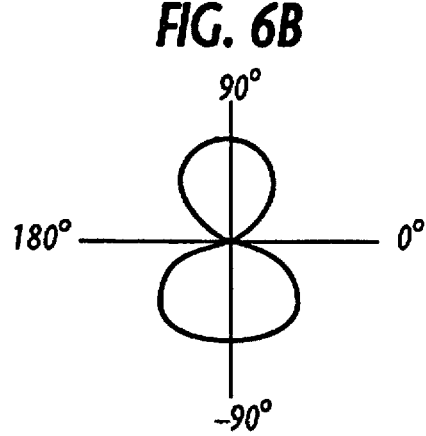
Figure 6C:
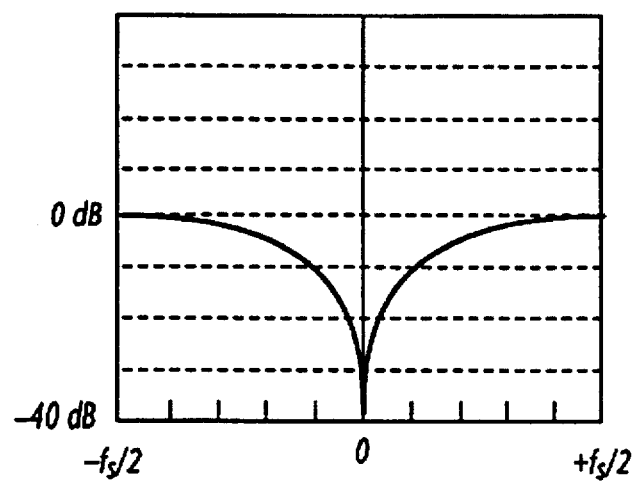

Results of the computer simulation performed on the normal Equation (20) are plowed as shown in FIGS. 6A, 6B and 6C. Using the principle of superposition, the two-element filter model of FIG. 5 is separated into two sections, one with the reference tap weights $c_{10}$ and $c_{20}$ and the other with the second tap weights $c_{11}$ and $c_{21}$ and simulations were made respectively on the separated sections. The figure eight pattern shown at FIG. 6A is the result of the simulation on a section of the two-element filter model that includes the reference tap weights $c_{10}$ and $c_{20}$ by solving the normal Equations (19a) and (20). The directivity pattern shown at FIG. 6B is the result of the simulation on a section of the model formed by tap weights $c_{11}$ and $c_{21}$, using Equations (19b) and (20).

It is seen that the main lobe is oriented in the arrival direction of the desired signal. In the prior art adaptive array in which null points are formed in the arrival direction of jamming signals for nulling such jamming signals. Whereas, in the present invention, CW interference cancellation is performed by a linear superposition of two signals of opposite phase as follows. By superposing the outputs of multipliers $41_{10}$ and $41_{20}$ with the outputs of multipliers $41_{11}$ and $41_{21}$ by combiner 15, jamming signal component $\sqrt{J}e^{j\Omega t}$ and jamming signal component $\sqrt{J}e^{j(\Omega t-\phi_j)}$ are cancelled out each other. Although the preceding symbol $a_{i-1}$ is combined with the desired symbol $a_i$, introducing an intersymbol interference, this undesired component is cancelled by an estimate of the symbol $a_{i-1}$ by the feedback filter 18. Therefore, the desired signal is not affected by the cancelling process of jamming signals.

While the directivity patterns of FIGS. 6A and 6B are the gains of the TDL antenna array in the space domain, the gain of the TDL antenna array in the frequency domain will be evaluated as follows by assuming that the desired signal $\exp(j\omega t)$ has a unit amplitude and representing the output of the combiner 15 as:

$$H(\omega)=i\{c_{10}+c_{20}\exp(-j\phi_j)\}+\{c_{11}+c_{21}\exp(-j\phi_j)\}\cdot(j\omega t) \quad (23)$$

The curve indicated in FIG. 6C is the frequency response of the two-antenna array in the direction of the jamming signal. The horizontal axis of FIG. 6C represents the modulation speed fs in the range between $-f_s/2$ and $+f_s/2$, and the vertical axis represents the gain at 10 dB intervals. A deep notch is observed at the center frequency (f=0). Due to the presence of this deep notch, the CW Interference is reduced to a minimum. Although it appears that the presence of such a deep notch would affect on the desired signal, the feedback filter 18 cancels intersymbol interference caused by the notch filtering effect. The deep notch frequency response produces, in effect, no adverse effect on the recovery of desired signal.

Figure 7A:
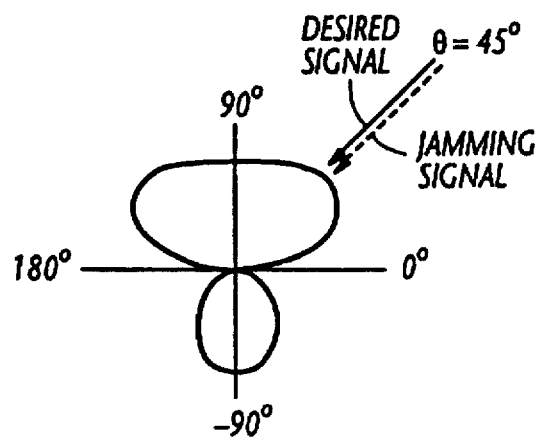
FIGS. 7A, 7B and 7C are graphic representations of the results of computer simulation on the single-interferer model of FIG. 5, wherein the frequency of the jamming signals is varied.
Figure 7B:
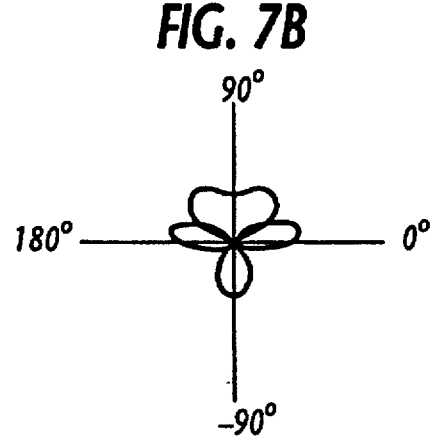
Figure 7C:
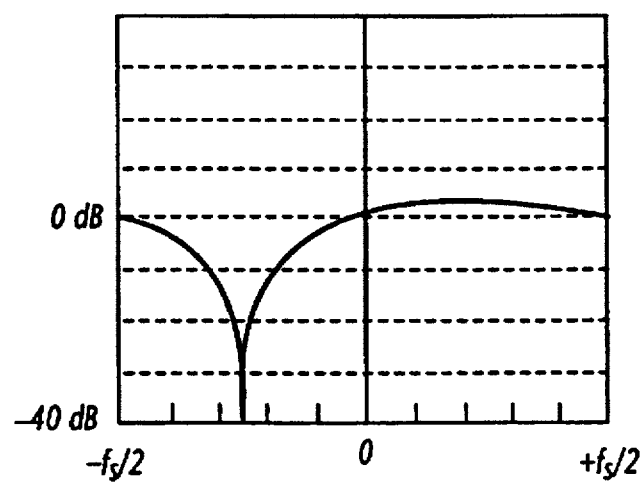

Further simulation results were derived from the single interferer model of FIG. 5 as shown in FIGS. 7A, 7B and 7C by exclusively shifting the frequency of the hypothetical CW jamming signal from f=0 to f=-0.25$f_s$. The directivity pattern shown at FIG. 7A is a result obtained from the reference tap weights $c_{10}$ and $c_{20}$. It is seen that the desired signal can be received with maximum antenna gain. The directivity pattern shown at FIG. 7B is a result obtained front tap weights $c_{11}$ and $c_{21}$. The frequency response of the two-element antenna array of FIG. 5 is shown in FIG. 7C, which indicates that a deep notch occurs in the range between -0.25$f_s$ and +0.25$f_s$ for cancelling the CW jamming signal.

Figure 8:
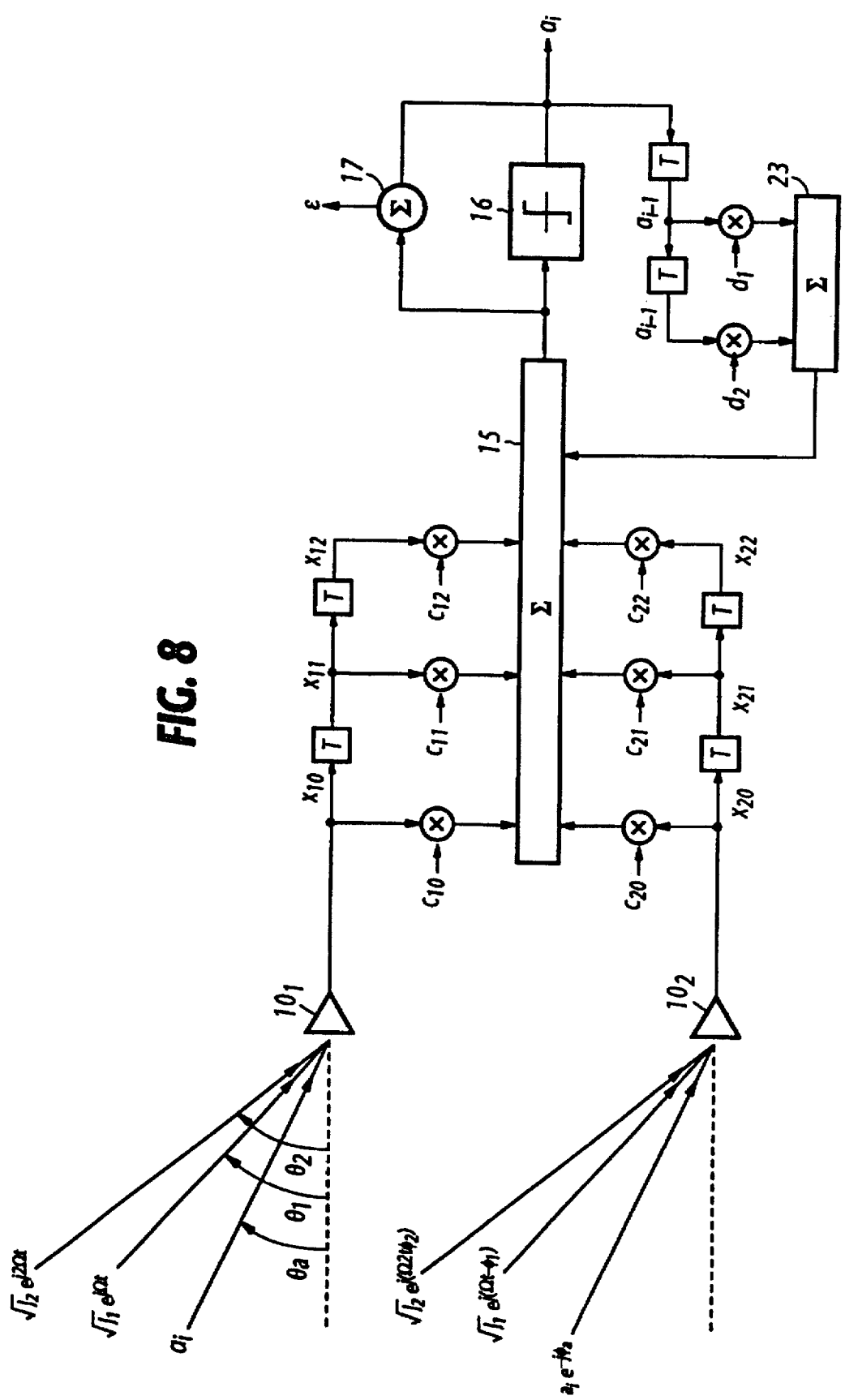
FIG. 8 is a block diagram of a simplified model of the second embodiment for computer simulation using two hypothetical interferers.

While mention has been made of a single interferer model, the embodiment of FIG. 4 has the ability to cancel interference signals coming from more than one jamming source if each of the TDL adaptive filters 40 has at least three delay-line tap and the feedback filter 18 has at least two delay-line taps as shown in FIG. 8.

A propagation model is considered for the computer simulation by assuming that CW jamming signals at frequencies $\Omega_1$ and $\Omega_2$ are arriving at angles $\theta_1$ and $\theta_2$ respectively and a desired signal has no multipath component. The normal Equation (20) is applied to the two-interferer model, where the submatrices $\psi_{11}$ and $\psi_{12}$ are given by:

$$\Psi_{11} = \begin{bmatrix} 1+J_1+J_2+\rho & J_1 \cdot \exp(j\Omega_1 T) + & J_1 \cdot \exp(j2\Omega_1 T) + \\ & J_2 \cdot \exp(j\Omega_2 T) & J_2 \cdot \exp(j2\Omega_2 T) \\ J_1 \cdot \exp(-j\Omega_1 T) + & 1+J_1+J_2+\rho & J_1 \cdot \exp(j\Omega_1 T) + \\ J_2 \cdot \exp(-j\Omega_2 T) & & J_2 \cdot \exp(j\Omega_2 T) \\ J_1 \cdot \exp(-j2\Omega_1 T) + & J_1 \cdot \exp(-j\Omega_1 T) + & 1+J_1+J_2+\rho \\ J_2 \cdot \exp(-j2\Omega_2 T) & J_2 \cdot \exp(-j\Omega_2 T) & \end{bmatrix} \quad (24a)$$

$$\Psi_{12} = \begin{bmatrix} \exp(-j\phi_a) + & & \\ J_1 \cdot \exp(j\phi_1) + & J_1 \cdot \exp(j\Omega_1 T - \phi_1) + & J_1 \cdot \exp(-j2\Omega_1 T - \phi_1) + \\ J_2 \cdot \exp(j\phi_2) & J_2 \cdot \exp(j\Omega_2 T - \phi_2) & J_2 \cdot \exp(j2\Omega_2 T - \phi_2) \\ & \exp(-j\phi_a) + & \\ J_1 \cdot \exp(-j\Omega_1 T - \phi_1) + & J_1 \cdot \exp(j\phi_1) + & J_1 \cdot \exp(j\Omega_1 T - \phi_1) + \\ J_2 \cdot \exp(-j\Omega_2 T - \phi_2) & J_2 \cdot \exp(j\phi_2) & J_2 \cdot \exp(j\Omega_2 T - \phi_2) \\ & & \exp(-j\phi_2) + \\ J_1 \cdot \exp(-j2\Omega_1 T - \phi_1) + & J_1 \cdot \exp(-j\Omega_1 T - \phi_1) + & J_1 \cdot \exp(j\phi_1) + \\ J_2 \cdot \exp(-j2\Omega_2 T - \phi_2) & J_2 \cdot \exp(-j\Omega_2 T - \phi_2) & J_2 \cdot \exp(j\phi_2) \end{bmatrix} \quad (24b)$$

$$H_1^T = \begin{bmatrix} 0 & 1 & 0 \\ 0 & 0 & 1 \end{bmatrix} \quad (24c)$$

$$H_2^T = \begin{bmatrix} 0 & \exp(-j\phi_a) & 0 \\ 0 & 0 & \exp(-j\phi_a) \end{bmatrix} \quad (24d)$$

$$S_1^T = [1\ 0\ 0] \quad (24e)$$
$$S_2^T = [\exp(-j\phi_a)\ 0\ 0] \quad (24f)$$
$$0 = [0\ 0] \quad (24g)$$
$$C_1^T = [c_{10}\ c_{11}\ c_{12}] \quad (24h)$$
$$C_2^T = [c_{20}\ c_{21}\ c_{20}] \quad (24i)$$
$$D^T = [d_1\ d_2] \quad (24j)$$

where, $\phi_a = \pi \sin \theta_a, \phi_1 = \pi \sin \theta_1, \phi_2 = \pi \sin \theta_2$.

A computer simulation was made on a two-interferer model by assuming that a unit the desired signal S and jamming signals $J_1$ and $J_2$ all are arriving at 60° at 0-dB D/U ratio and the frequencies $\Omega_1$ and $\Omega_2$ of the jamming signals $J_1$ and $J_2$ are 0 and $-0.25fs \times 2\pi$, respectively. The signal-to-noise ratio was set to 60 dB.

Figure 9A:
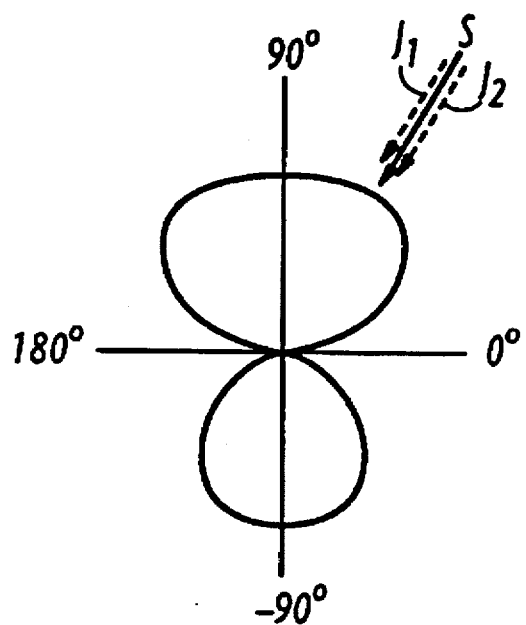
FIGS. 9A and 9B are graphic representations of the results of computer simulation on the two-interferer model of FIG. 8, wherein the arrival direction of the jamming signals is kept constant.

The figure eight pattern shown at FIG. 9A is the result of the computer simulation on a section of the two-interferer model of FIG. 8 that includes the reference tap weights $c_{10}$ and $c_{20}$. It is seen that the main lobe of the pattern is oriented at 60°.

Figure 9B:
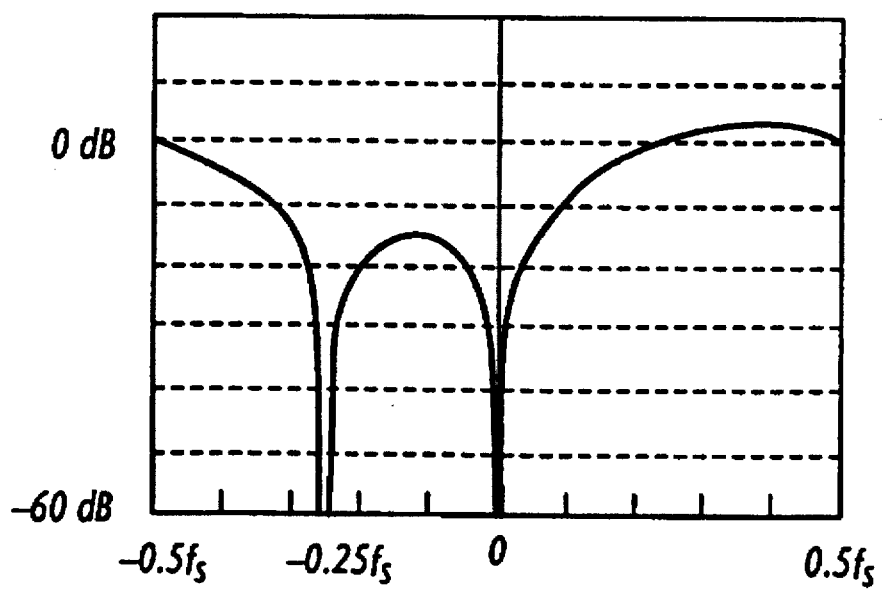

By solving the following Equation which generally represents the frequency response of the FIG. 4 embodiment using the parameters given above,
a frequency response having two notch filtering effects as shown in FIG. 9B was obtained for the two-interferer model of FIG. 8. Although the desired and jamming signals are arriving in the same direction, the jamming signals are cancelled by the notch filtering effects of the two-TDL adaptive filters. Intersymbol interferences introduced to the desired signal by the notch filtering effects are cancelled by the feedback filter 18 as in the single-interferer model.

Figure 10A:
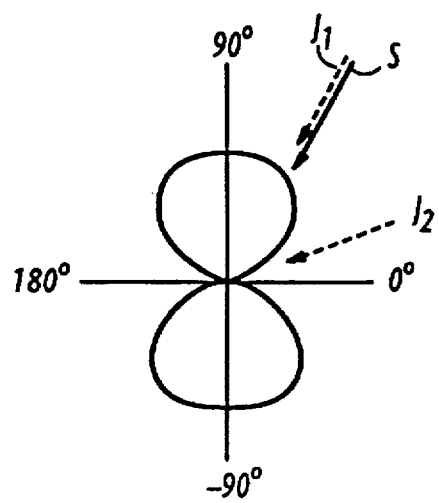
FIGS. 10A, 10B and 10C are graphic representations of the results of computer simulation on the two-interferer model of FIG. 8, wherein the arrival direction of the jamming signals is varied.
Figure 10B:
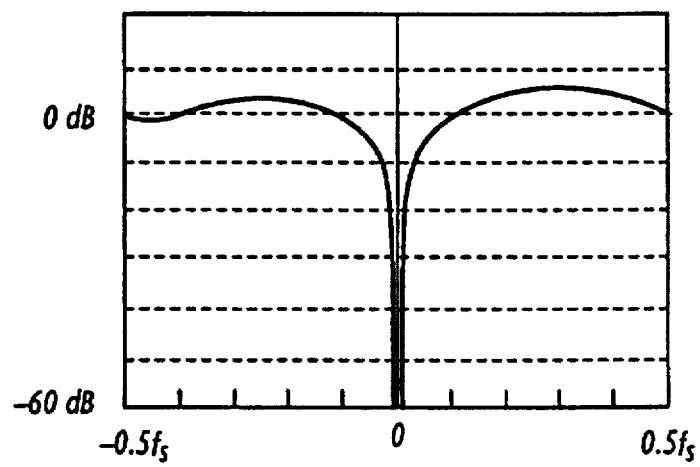
Figure 10C:
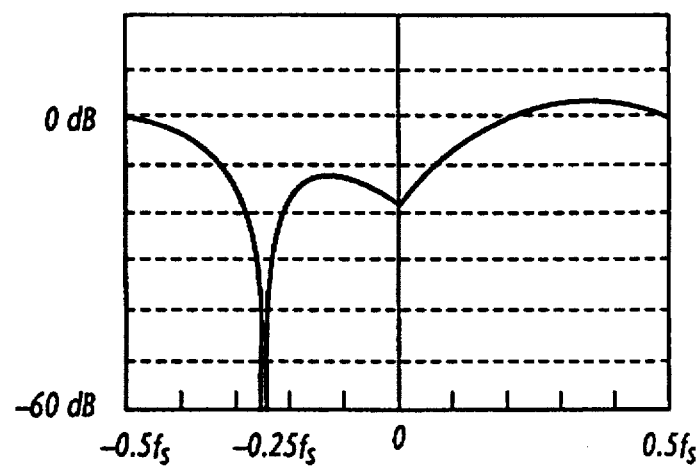

Further simulation results were derived from the two-interferer model of FIG. 8 as shown in FIGS. 10A, 10B and 10C by shifting the arrival direction of the jamming signal $J_2$ from 60° to 20°. The directivity pattern shown at FIG. 10A is a result derived from the reference tap weights $c_{10}$ and $c_{20}$. The frequency response of the two-interferer model for jamming signal $J_1$ (arriving at 60°) is shown in FIG. 10B. It is seen that jamming signal $J_1$ is reduced to a minimum by a deep notch that occurs at 0 frequent. The frequency response of the two-interferer model for jamming signal $J_2$ (arriving at 20°) is shown in FIG. 10C, indicating that jamming signal $J_2$ is reduced to a minimum by a deep notch that occurs at frequency $-0.25f_s$.

It is seen from the foregoing description that by setting the reference tap at the center of the delay line of each TDL adaptive filter optimum equalization and intersymbol interference cancellation can be realized. With the reference tap of each TDL filter being set at the delay-line center point, the antennas' main lobe is oriented in the arrival direction of the desired signal for maximum gain reception, the taps of each that precedes the reference tap and the taps following the reference tap constitute a matched filter for removing dispersed components of the desired signal so that implicit diversity gain is obtained, and jamming signals are cancelled by linear superposition of a set of preceding weighted tap signals and a set of succeeding weighted tap signals. Additionally, precursor distortions are removed by the TDL adaptive filters and postcursor distortions are removed by the feedback filer.

Figure 11:
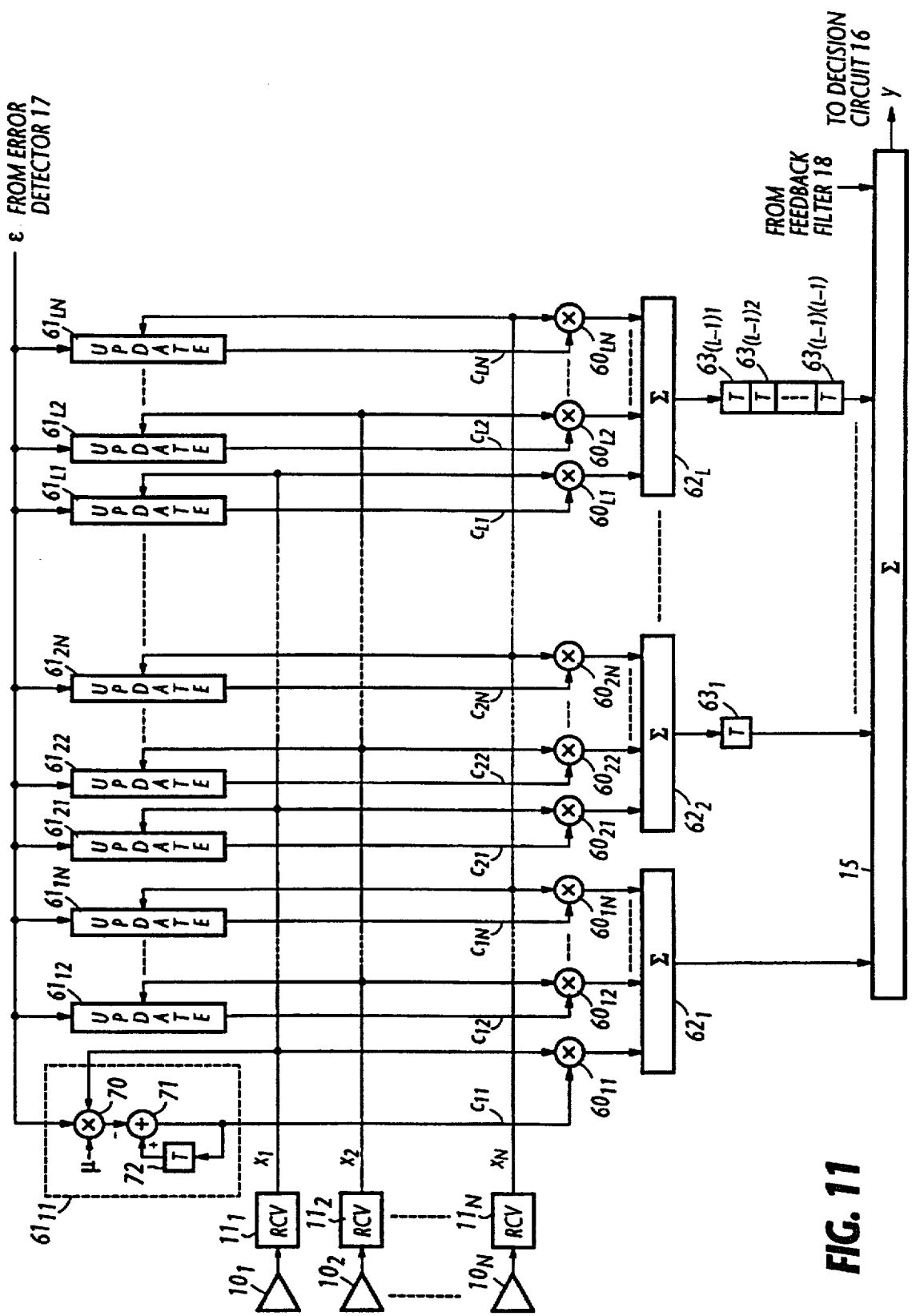
FIG. 11 is a block diagram of a digital radio receiver according to a modified form of the second embodiment of the present invention.

A modified form of the N-element TDL adaptive filter array of FIG. 4 is shown in FIG. 11. The modified N-element adaptive filter array comprises L groups of N multipliers $60_{ik}$, (where i=1, 2, ... L and k=1, 2, ..., N). The multipliers 60 of each group are connected to receive baseband signals $x_1-x_N$ from the receivers $11_1-11_N$, respectively. L groups of N update circuits $61_{ik}$ are connected respectively to the N multipliers 60 of the corresponding groups for supplying weight coefficients $c_{ik}$ to the multipliers of the corresponding groups, and L summers $62_1-62_L$ corresponding to the groups of multipliers 60 and connected to the outputs of the multipliers of the corresponding groups. The output of summer $62_1$ is directly connected to the summer 15 and the output of summer $62_2$ is connected to the summer 15 through a symbol-interval (T) delay element $63_1$. The output of summer $62_L$ is connected to the summer 15 through a series of symbol-interval delay element $63_{(L-1)} \sim 63_{(L-1)(L-1)}$, so that the output of summer $62_L$ is delayed by (L-1) symbol intervals with respect to the output of summer $62_1$.

In each update circuit $61_k$ of each group i, the weight coefficient $c_{ik}$ is derived by a complex correlator 70 in which the decision error $\epsilon$ is multiplied with a correction coefficient $\mu$ to produce a corrected error $\mu\epsilon$ which is then correlated with a complex conjugate of a corresponding baseband signal $x_k$ to produce an update signal. The update signal is subtracted in a subtractor 71 from the output of a symbol-interval delay element 72 to produce a weight coefficient $c_{ik}$ at the output of subtractor 71. If each of the TDL filters of FIG. 4 were to be formed with three delay taps, such TDL filters would be equivalent to the receiver of FIG. 11 having three summers $62_1$, $62_2$ and $62_{L=3}$ with two symbol delays introduced to the output of summer $62_3$ and two delay taps in the feedback filter 18.

What is claimed is:

1. A decision feedback equalizer for an array of antennas receiving a modulated carrier with a plurality of receiver means connected respectively to the antennas for recovering a plurality of symbol sequences from the carrier, said antennas being spaced at intervals equal to one-half of the wavelength of said carrier, the decision feedback equalizer comprising:

first filter means connected to the receiver means and respectively multiplying said symbol sequences with first weight coefficients;

combiner means combining the multiplied symbol sequences from said first filter means with second symbols applied thereto and producing therefrom a combined symbol sequence;

decision means making a decision on the combined symbol sequence and producing therefrom a decision symbol sequence;

second filter means multiplying decision symbols successively supplied from said decision means respectively with second weight coefficients and applying the multiplied decision symbols as said second symbols to said combiner means;

error detector means detecting a difference between said decision symbol sequence and said combined symbol sequence and deriving therefrom a decision error;

first update means updating said first weight coefficients with correlations between said decision error and the symbol sequences from said receiver means so that a mean square of said decision error is reduced to a minimum value; and second update means updating said second weight coefficients with correlations between said decision error and decision symbols successively supplied from the decision means so that the mean square of said decision error is reduced to the minimum value.

2. A decision feedback equalizer as claimed in claim 1, wherein said first update means comprises a plurality of update circuits corresponding respectively to said receiver means, each of said update circuits deriving a weight coefficient from said decision error and the symbol from the corresponding receiver means, and wherein said first filter means comprises a plurality of multipliers corresponding respectively to said receiver means and said update circuits for respectively multiplying symbols from the corresponding receiver means with the weight coefficients from the corresponding update circuits.

3. A decision feedback equalizer as claimed in claim 2, wherein each of said update circuits includes means correlating said decision error with the symbol sequence from the corresponding receiver means to produce a correlation signal and subtracting means subtracting the correlation signal from a delayed version of the correlation signal to derive said weight coefficient.

4. A decision feedback equalizer as claimed in claim 1, wherein said first update means comprises a plurality of groups of update circuits, the update circuit groups corresponding respectively to said receiver means, each of the update circuits of each group deriving a weight coefficient from said decision error and one of a series of symbols supplied from the corresponding receiver means, wherein said first filter means comprises:
a plurality of tapped-delay lines connected respectively to said receiver means; and
a plurality of groups of multipliers, the multiplier groups corresponding respectively to said tapped-delay lines and said update circuit groups, the multipliers of each group being connected respectively to successive taps of the corresponding tapped-delay line for respectively multiplying symbols at the successive taps with weight coefficients supplied from the update circuits of the corresponding group and supplying the multiplied symbols to said combiner means.

5. A decision feedback equalizer as claimed in claim 4, wherein each of said update circuits comprises means for correlating said decision error with a symbol supplied from a corresponding one of the successive taps of a corresponding one of the tapped delay lines to produce a correlation signal and subtracting means subtracting the correlation signal from a delayed version of the correlation signal to produce said weight coefficient.

6. A decision feedback equalizer as claimed in claim 1, wherein said first update means comprises a plurality of groups of update circuits, the update circuits of each group corresponding respectively to said receiver means, each of said update circuits of the group deriving a weight coefficient from said decision error and a symbol supplied from the corresponding receiver means, wherein said first filter means comprises:
a plurality of groups of multipliers, the multiplier groups corresponding respectively to said update circuit groups, the multipliers of each group being connected respectively to said receiver means for respectively multiplying symbols from the receiver means with weight coefficients supplied from the update circuits of the corresponding group;
a plurality of summers corresponding respectively to the multiplier groups for summing the multiplied symbols of the corresponding multiplier group and producing therefrom a plurality of summed symbols; and
a plurality of delay means respectively producing delays to ones of the summed symbols by different amounts and applying a non-delayed summed symbol and delayed summed symbols to said combiner means.

7. A decision feedback equalizer as claimed in claim 6, wherein each of said update circuits includes correcting means correlating said decision error with a symbol sequence supplied from a corresponding one of said receiver means to produce a correlation signal and subtracting means subtracting the correlation signal from a delayed version of the correlation signal to produce said weight coefficient.

8. A decision feedback equalizer as claimed in claim 1, 2, 4, or 6, wherein said second filter means comprises:

a tapped-delay line connected to said decision means for producing a series of decision symbols at successive taps of the tapped-delay line; and a plurality of multipliers connected respectively to successive taps of said tapped-delay line for multiplying said decision symbols at said successive taps with said second weight coefficients respectively and supplying the multiplied decision symbols to said combiner means, wherein said second update means includes a plurality of update circuits corresponding respectively to the successive taps of the tapped-delay line of said second filter means for deriving said second weight coefficients from said decision error and said decision symbols from said corresponding taps.

9. A decision feedback equalizer as claimed in claim 8, wherein each of said update circuits of the second update means includes correlating means correlating said decision error with a decision symbol from the corresponding tap of said tapped-delay line to produce a correlation signal and subtracting means subtracting the correlation signal from a delayed version of the correlation signal to produce said second weight coefficient.

10. A decision feedback equalizer as claimed in claim 1, wherein said plurality of receiver means being a plurality of receivers.

11. A radio receiving apparatus comprising:

an array of antennas for receiving a modulated carrier and a plurality of receiver means connected respectively to said antennas for recovering a plurality of symbol sequences from the carrier, said antennas being spaced at intervals equal to one half of the wavelength of said carrier;

first filter means connected to the receiver means and respectively multiplying the symbol sequences therefrom with first weight coefficients;

combiner means combining the multiplied symbol sequences from said first filter means with second symbols applied thereto and producing therefrom a combined symbol sequence;

decision means making a decision on the combined symbol sequence and producing therefrom a decision symbol sequence;

second filter means multiplying decision symbols successively supplied from said decision means respectively with second weight coefficients and applying the multiplied decision symbols as said second symbols to said combiner means;

error detector means detecting a difference between said decision symbol sequence and said combined symbol sequence and deriving therefrom a decision error;

first update means updating said first weight coefficients with correlations between said decision error and the symbol sequences from said receiver means so that a mean square of said decision error is reduced to a minimum value; and second update means updating said second weight coefficients with correlations between said decision error and the decision symbols successively supplied from the decision means so that the mean square of said decision error is reduced to the minimum value.

12. A radio receiving apparatus as claimed in claim 11, wherein said first update means comprises a plurality of update circuits corresponding respectively to said receiver means, each of said update circuits deriving a weight coefficient from said decision error and the symbol sequence from the corresponding receiver means, and wherein said first filter means comprises a plurality of multipliers corresponding respectively to said receiver means and said update circuits for respectively multiplying symbol sequences from the corresponding receiver means with the weight coefficients from the corresponding update circuits.

13. A radio receiving apparatus as claimed in claim 12, wherein each of said update circuits includes means for correlating said decision error with the symbol sequence from the corresponding receiver means to produce a correlation signal and means for subtracting the correlation signal from a delayed version of the correlation signal to derive said weight coefficient.

14. A radio receiving apparatus as claimed in claim 11, wherein said first update means comprises a plurality of groups of update circuits, the update circuit groups corresponding respectively to said receiver means, each of the update circuits of each group deriving a weight coefficient from said decision error and the symbol sequence from the corresponding receiver means, wherein said first filter means comprises:

a plurality of tapped-delay lines connected respectively to said receiver means; and a plurality of groups of multipliers, the multiplier groups corresponding respectively to said tapped-delay lines and said update circuit groups, the multipliers of each group being connected respectively to successive taps of the corresponding tapped-delay line for respectively multiplying symbols at the successive taps with weight coefficients supplied from the update circuits of the corresponding group and supplying the multiplied symbols to said combiner means.

15. A radio receiving apparatus as claimed in claim 14, wherein each of said update circuits comprises correlating means correlating sad decision error with a symbol supplied from a corresponding one of the successive taps of a corresponding one of the tapped delay lines to produce a correlation signal and subtracting means subtracting the correlation signal from a delayed version of the correlation signal to produce said weight coefficient.

16. A radio receiving apparatus as claimed in claim 11, wherein said first update means comprises a plurality of groups of update circuits, the update circuits of each group corresponding respectively to said receiver means, each of said update circuits of the group deriving a weight coefficient from said decision error and a symbol sequence supplied from the corresponding receiver means, wherein said first filter means comprises:

a plurality of groups of multipliers, the multiplier groups corresponding respectively to said update circuit groups, the multipliers of each group being connected respectively to said receiver means for respectively multiplying symbols from the receiver means with weight coefficients supplied from the update circuits of the corresponding group;

a plurality of summers corresponding respectively to the multiplier groups for summing the multiplied symbols of the corresponding multiplier group and producing therefrom a plurality of summed symbols; and a plurality of delay means respectively providing delays to ones of the summed symbols by different amounts and applying a non-delayed summed symbol and delayed summed symbols to said combiner means.

17. A radio receiving apparatus as claimed in claim 16, wherein each of said update circuits includes correlating means correlating said decision error with a symbol sequence supplied from the corresponding receiver means to produce a correlation signal and subtracting means subtracting the correlation signal from a delayed version of the correlation signal to produce said weight coefficient.

18. A radio receiving apparatus as claimed in claim 11, 12, 14, or 16, wherein said second filter means comprises:

a tapped-delay line connected to said decision means producing a series of decision symbols at successive taps of the tapped-delay line; and a plurality of multipliers connected respectively to successive taps of said tapped-delay line for multiplying said decision symbols at said successive taps with said second weight coefficients respectively and supplying the multiplied decision symbols to said combiner means, wherein said second update means includes a plurality of update circuits corresponding respectively to the successive taps of the tapped-delay line of said second filter means for deriving said second weight coefficients from said decision error and said decision symbols from said corresponding taps.

19. A radio receiving apparatus as claimed in claim 18, wherein each of said update circuits of the second update means includes correlating means correlating said decision error with a decision symbol from the corresponding tap of said tapped-delay line to produce a correlation signal and subtracting means subtracting the correlation signal from a delayed version of the correlation signal to produce said second weight coefficient.

20. A radio receiving apparatus as claimed in claim 11, wherein said plurality of receiver means being a plurality of receivers.

* * * * *